INVENTORS R. L. HORLACHER
M. A. LOGAN
BY R C Lipton
ATTORNEY

Dec. 6, 1966 R. L. HORLACHER ET AL 3,290,611

DIGITAL FREQUENCY CONTROL CIRCUIT

Filed Sept. 14, 1965 3 Sheets-Sheet 2

United States Patent Office 3,290,611

Patented Dec. 6, 1966

3,290,611

DIGITAL FREQUENCY CONTROL CIRCUIT

Robert L. Horlacher and Mason A. Logan, Colts Neck, N.J., assignors to Bell Telephone Laboratories, Incorporated, New York, N.Y., a corporation of New York Filed Sept. 14, 1965, Ser. No. 487,212

9 Claims. (Cl. 331—14)

Figure 1:
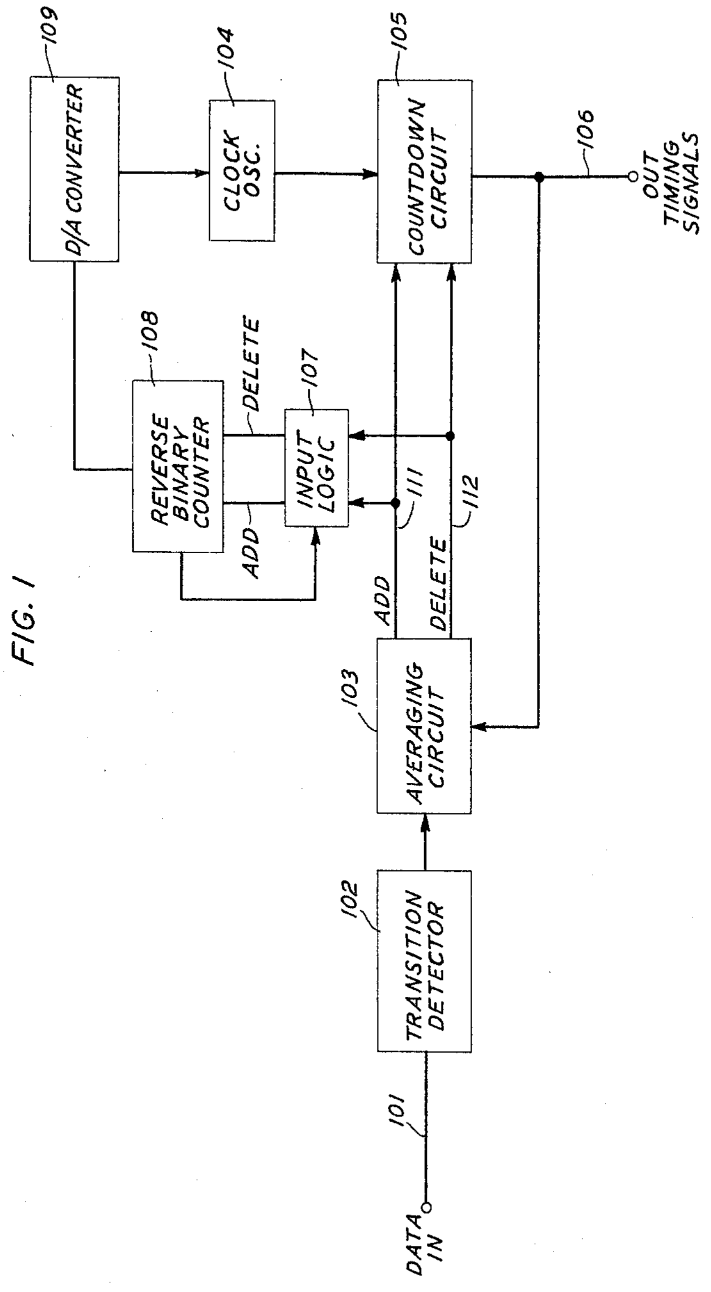

This invention relates to synchronous data communication systems and, more particularly, to frequency control circuits for synchronous data receivers.

It is a broad object of this invention to synchronize the clock oscillator of synchronous data receivers with the incoming data signals.

In the copending application of Paul A. Baker and Mason A. Logan, Ser. No. 294,793, filed July 9, 1963, there is disclosed a local clock oscillator for a synchronous data receiver which clock provides timing signals utilized for the recovery of received data. The clock includes an oscillator and a frequency-dividing countdown chain connected to the output thereof to provide timing signals having approximately the frequency of the received data signals. The phase of the timing signals and the crossovers or transitions of the incoming signals are compared in an averaging circuit. If, over a period of time, the incoming data signal transitions occur preponderantly before or after the timing wave transitions, an "add" or "delete" correction signal is applied to the countdown circuit to advance or retard the timing wave signal an incremental phase interval. Thus, the clock oscillator is phase-locked to the incoming data signals.

In the phase-locked system, when the frequency of the sending end oscillator does not perfectly match that of the receiver clock, a continuous phase drift occurs requiring corresponding continuous phase corrections at the receiver. To eliminate the continuous phase corrections, it is therefore desirable to lock the frequency of the local oscillator to the sending end. This may be accomplished by utilizing the available phase correction signals to modify the frequency of the local clock.

Accordingly, it is an object of this invention to utilize indications of phase errors to simultaneously correct the frequency and the phase of synchronous data receiver clock oscillators. Since the phase error signal indications are binary in form, the frequency lock circuit advantageously utilizes standard digital circuits to accumulate and store the binary indications and thus maintain the oscillator tuned to the last correct frequency match. This is preferred when signal loss or drop-out occurs since, during the drop-out period, frequency drift is minimized and a near perfect frequency match may be maintained.

Assuming that a drop-out occurs in the received line signal, during the drop-out period the receiver clock phase will drift due to corrections caused by line noise and also due to any slight relative frequency difference between the sending end and receiving end oscillators. Thus, upon signal restoration, correction signals will be developed to re-establish phase synchronism. These corrections, however, will also modify the frequency of the clock oscillator pulling it away from the prior frequency match with the sending end.

It is another object of this invention to prevent the frequency lock circuit from pulling the oscillator away from a prior match during a phase-lock pull in period.

It is a feature of this invention that the application of the correction signals to the frequency lock circuit is precluded when the repetition rate of the signals exceeds a predetermined threshold.

It is another feature of this invention that the application of correction signals to the frequency lock circuit is blocked for a predetermined interval of time after the development of each of the correction signals.

Figure 2:
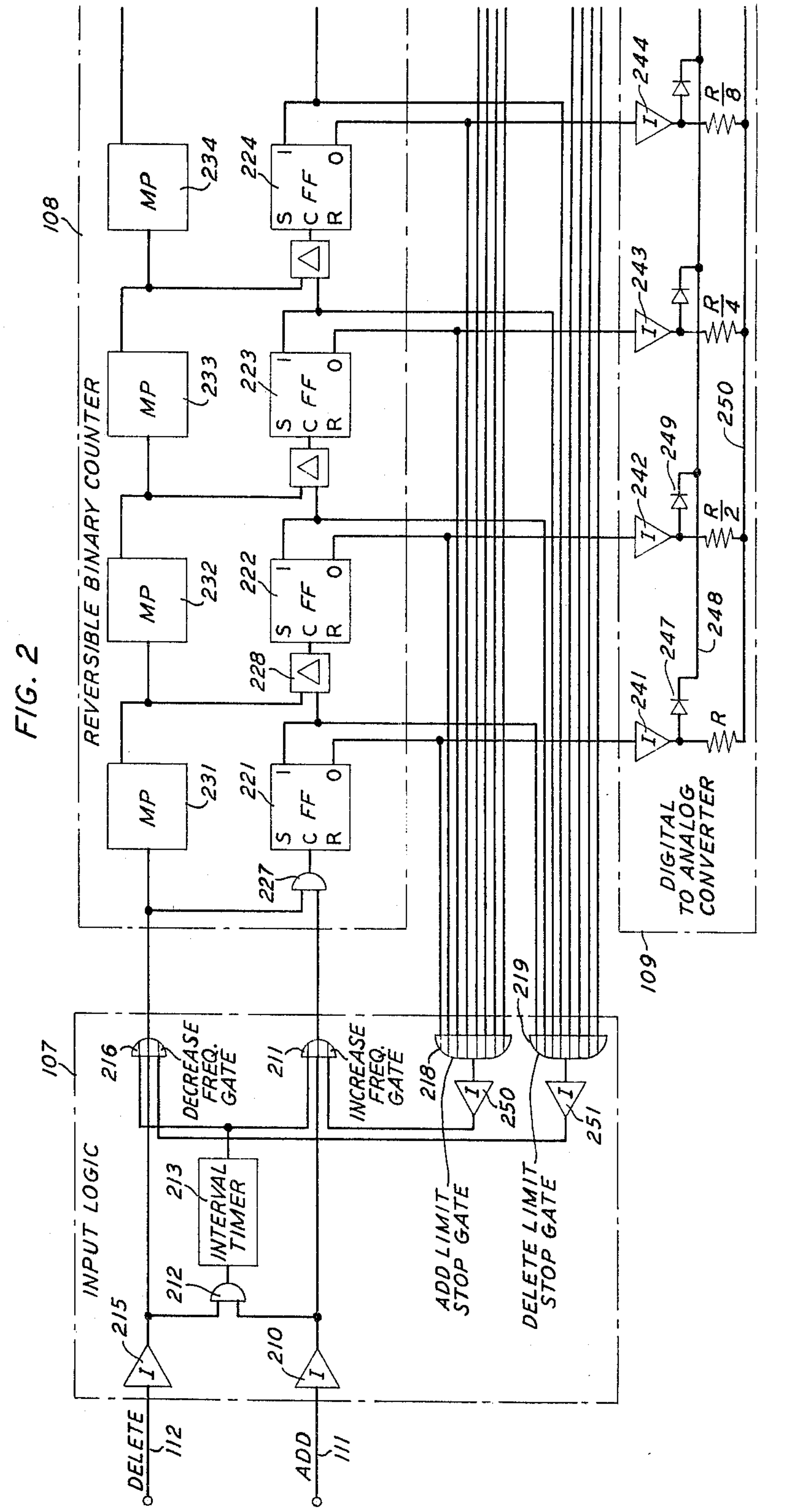
Figure 3:
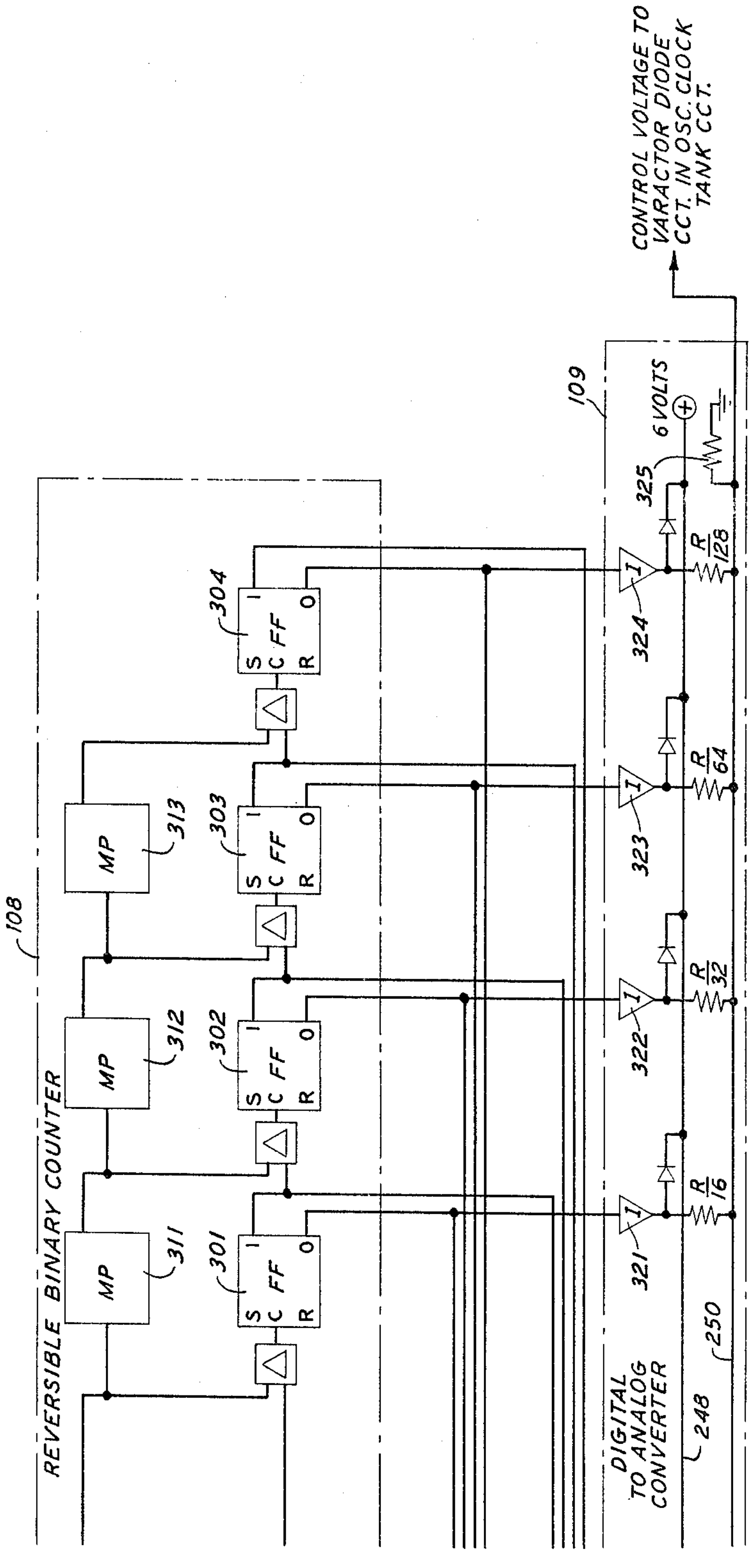

The foregoing and other objects and features of this invention will be fully understood from the following description of an illustrative embodiment thereof taken in conjunction with the accompanying drawing wherein:

FIG. 1 is a block diagram showing an arrangement for providing simultaneous phase lock and frequency lock for a local clock oscillator; and FIGS. 2 and 3, when arranged side by side, disclose in a more detailed block diagram a frequency lock circuit in accordance with the invention.

Referring to FIG. 1, incoming synchronous data appears on lead 101 and is applied to transition detector 102. The output of transition detector 102 is connected to averaging circuit 103 which also has applied thereto the timing wave signals on lead 106. The timing wave signals on lead 106 are derived from clock oscillator 104, the output of which is frequency divided by countdown circuit 105 to the appropriate frequency of the incoming signal wave.

As disclosed in the above-identified application of P. A. Baker et al, the incoming synchronous data is applied to transition detector 102 which detects the signal crossovers or transitions. These transitions are then applied to averaging circuit 103 where the phase thereof is compared with the phase of the timing wave on lead 106. If the phase of the incoming transitions leads the phase of the timing wave, averaging circuit 103 develops an "add" impulse and applies it to "ADD" lead 111. This impulse is then passed to countdown circuit 105 to advance the phase thereof whereby the phase of the timing wave on lead 106 is correspondingly advanced to phase synchronize with the incoming data. Conversely, if the phase of the incoming transitions lags that of the timing wave, averaging circuit 103 applies a "delete" impulse via "DELETE" lead 112 to countdown circuit 105. Countdown circuit 105, in turn, retards the phase of the timing wave on lead 106 to correspond with the incoming data signals.

In accordance with a preferred embodiment of the invention, "ADD" lead 111 and "DELETE" lead 112 are also extended to an input logic circuit generally indicated by block 107. Input logic circuit 107 normally passes the add and delete impulses to reversible binary counter 108 which advances one count in response to an add impulse and deletes one count in response to a delete impulse. Thus binary counter 108 accumulates a count which is increased or decreased by the add or delete phase correction impulses. As described hereinafter, input logic circuit 107 includes a timing arrangement for blocking the add or delete impulses in the event that the repetition rate of the impulses exceeds a predetermined threshold. This provides the function of precluding the modification of the count in counter 108 during a phase-lock pull-in peroid. In addition, input logic circuit 107 includes a gate circuit for determining when counter 108 is full or empty and, upon the detection thereof, blocking the correction impulse which would thereafter reset the counter. This guards against the loss of the accumulated count in counter 108.

The output of counter 108 is connected to digital-to-analog converter 109. Converter 109 examines the digital count in counter 108 and converts it to a voltage level corresponding to the weight of the count. This voltage level is then applied to clock oscillator 104 as a bias to modify the frequency thereof. One preferred manner of modifying the frequency of an oscillator in accordance with a voltage bias applied thereto is disclosed in Patent 3,139,593 issued to W. Kaminski and H. A. Schneider on June 30, 1964. As disclosed in the W Kaminski et al. patent, the oscillator has its output frequency determined by a frequency-determining circuit which includes a fine tuning control comprising a pair of varactor diodes. As further disclosed therein, a variable voltage bias is applied to the varactor diodes to provide variable reverse bias and thus modify the resonant tuning of the frequency-determining circuit. Thus, with the output of converter 109 connected to the fine tuning control of oscillator 104, which oscillator is preferably of the type disclosed in the W. Kaminski et al. patent, the voltage level at the output of converter 109 controls the frequency of oscillator 104. Accordingly, when the count in counter 108 is increased by an add impulse, the voltage level of the output of converter 109 is increased, increasing the reverse bias and thus increasing the frequency of oscillator 104 and when a delete impulse is applied to counter 108, the frequency of oscillator 104 is thus decreased. In addition, where no correction impulses are applied to counter 108, the output voltage level of converter 109 remains fixed, maintaining the frequency of oscillator 104 fixed.

Referring now to FIGS. 2 and 3, and more specifically to FIG. 2, the add impulses derived, as previously described, from averaging circuit 103, are applied to lead 111, FIG. 2, and thus to the input logic circuit, generally shown as block 107. Similarly, the delete impulses obtained from averaging circuit 103 are provided to lead 112 and thence to input logic circuit 107, previously described with respect to FIG. 1. Correspondingly, input logic circuit 107 is connected to the reversible binary counter, generally indicated by block 108 in FIGS. 2 and 3 and counter 108, in turn, is connected to the digital-to-analog converter, generally indicated by block 109.

Returning now to input logic circuit 107, "ADD" lead 111 and "DELETE" lead 112 are connected to inverters 210 and 215, respectively. Inverters 210 and 215 are well known in the art and function to provide at the output thereof a condition corresponding to the inverse of the input condition. For example, with "ADD" lead 111 in the normal negative or zero condition, the output of inverter 210 is maintained in a positive or "1" condition. Upon the application of the add impulse to lead 111 and thus the application of a positive pulse to inverter 210, a negative or zero bit is provided at the output thereof. Similarly, the application of a delete impulse to inverter 215 momentarily applies a negative pulse to the normal positive output of inverter 215.

The output of inverter 210 is connected to the input of OR gate 211 and to one input of AND gate 212. The output of inverter 215 is connected to one input of OR gate 216 and to the other input of AND gate 212. With both inputs of AND gate 212 normally in the positive condition, the output thereof is similarly maintained in a positive condition. In the event, however, that a negative impulse is applied to one of the inputs thereof, the output of AND gate 212 will provide a negative pulse.

The output of AND gate 212 is connected to an interval timer, generally indicated by block 213. Interval timer 213 is a monostable circuit normally applying a negative condition to the output thereof. In the event, however, that a negative transition is applied to the input of interval timer 213 by AND gate 212, the output of interval timer 213 is driven to the positive or "1" condition for a predetermined interval of time. The purpose of interval timer 213 will be described hereinafter. It is noted, however, at this time, that the output of interval timer 213 is normally negative and is connected to inputs of OR gates 211 and 216.

In addition, to the outputs of inverter 210 and interval timer 213 being connected to OR gate 211, a third input is connected to OR gate 211 extending from the output of OR gate 218 my way of inverter 250. OR gate 211 provides a positive condition at the output thereof in the event that one or more of its input leads is positive. As previously described, the output of inverter 210 is normally positive unless an add impulse is applied thereto. The output of interval timer 213, however, is normally negative and as described hereinafter, inverter 250 is also applying a negative condition to OR gate 211. Accordingly, the output of OR gate 211 is maintained in the positive condition unless an add pulse is applied thereto by way of inverter 210, whereupon a negative impulse is obtained at the output of OR gate 211.

OR gate 216, as previously described, has inputs connected to the outputs of inverter 215 and interval timer 213. In addition, a third input extends by way of inverter 251 to the outputs of OR gate 219. As described hereinafter, the output of inverter 251 is normally negative and with interval timer 213 also applying a negative condition to OR gate 216, the only positive condition applied thereto is by inverter 215. Accordingly, the output of OR gate 216 is maintained in a positive condition until a delete impulse applied to inverter 215 drives the output thereof to a negative condition.

The output of OR gate 211 is connected to one input of AND gate 227 in counter 108. The other input to AND gate 227 extends to the output of OR gate 216. In addition, the output of OR gate 216 is connected to monopulser 231 in counter 108.

Counter 108 comprises binary stages 221 through 224, FIG. 2, and 301 through 304, FIG. 3. Each of the binary stages comprises a bistable flip-flop provided with a set, reset and toggle input and set and reset output. As is well known in the art, the application of a negative input transition to the set or reset input of the flip-flop drives it to the corresponding set or reset condition. In addition, the application of a negative input transition to the toggle input, designated by the character "C," drives the flip-flop to the inverse condition, that is from the set to the reset or from the reset to the set condition. While the flip-flop is in the set condition, the set or "1" output thereof is maintained positive and the reset is maintained in the negative condition. Conversely, when the flip-flop is reset, the zero or reset output is in the positive condition and the set output is negative.

The "1" or set output of each of the flip-flop stages is connected by way of a differentiator circuit to the toggle input of the next subsequent stage. For example, the "1" output of binary stage 221 is connected by way of a differentiator circuit generally indicated by block 228 to the toggle input of stage 222. Circuit 228, and the corresponding subsequent circuits, include dual inputs and are arranged to provide a negative pulse output in response to the application of a negative voltage transition to either one of its dual inputs. Thus, as each stage is reset, the state of the next subsequent binary stage is changed and the binary stages operate as a binary counter.

As previously disclosed, the output of OR gate 216 also extends to the input of monopulser 231. The output of monopulser 231, in turn, is connected to a subsequent monopulser 232 and to the toggle input of binary stage 222 via circuit 228. In a corresponding manner, the output of monopulser 232 extends to a subsequent binary stage of counter 108 and to a subsequent monopulser 233. Similarly, monopulser stages 234, 311, 312 and 313 are connected in sequence, each output being also extended to a subsequent binary stage toggle input via a differentiator circuit.

Each of the monopulsers 231 through 234, 311 through 313 normally provide a negative output. In the event, however, that a negative input transition is applied to the input thereof, the output is driven positive and after a predetermined delay, which is longer than the length of a "DELETE" impulse, provides a negative transition back to the normally negative output condition. Accordingly, it is noted that the monopulsers successively apply negative transitions to each differentiator circuit and thus to each successive one of the binary stages allowing sufficient time for each count to propagate through the counter chain, thus adding $2^n-1$ to the previous count in the binary counter. As is well known in the art, this causes reverse counting by substracting one from the previous count in the binary stages.

Each of the "1" or set output terminals of the binary stages, in addition to the connection to the subsequent differentiator input, extends to an input of OR gate 219 in input logic circuit 207. Recalling now that the "1" outputs of the binary stages are in the negative condition when the flip-flop is reset, it is noted that at least one of the inputs to OR gate 219 is positive unless the binary count is zero and all flip-flop stages are reset. Accordingly, with the exception of the situation when a zero count is in the counter, OR gate 219 provides a positive condition at the output thereof. This condition is inverted by inverter 251 whereby a negative condition is normally provided to gate 216, as previously described. Similarly, the zero or reset outputs of the flip-flop stages are connected to the input of OR gate 218. Accordingly, the output condition of OR gate 218 is normally positive unless all the flip-flop stages are set and all the reset output leads are in the negative condition. Thus, assuming that binary counter 108 does not contain a full count, the output of gate 218 is positive and inverter 250 provides a negative condition to OR gate 211.

In addition to extending to OR gate 218, the reset outputs of the flip-flop stages are connected to inverters 241 through 244 and 321 through 324 in digital-to-analog converter 109.

Assuming a negative input to inverter 241 and a consequent positive output condition, this output is clamped to a positive 6-volt supply by way of diode 247 and lead 248. When the input to inverter 241 goes positive, the output thereof then drops to ground. Accordingly, the output of inverter 241 swings between positive 6 volts and ground depending upon the negative and positive input conditions applied thereto.

The output of inverter 241 extends to lead 250 by way of a resistor designated "R." Lead 250, in turn, is connected to ground by way of resistor 325, FIG. 3, and, in addition, extends to the varactor diodes such as diodes 26 and 27 in the tank circuit of the oscillator disclosed in the above-identified W. Kaminski et al. patent. Preferably, however, the cathode-to-anode path of each diode is reversed so that the potential on lead 250, which is positive with respect to ground, is extended to the cathodes and thus applies the appropriate reverse bias. Accordingly, when the output of inverter 241 is at ground, no current flows from inverter 241 through resistor R. Conversely, when the output of inverter 241 is positive, current flows therefrom through resistor R and resistor 325 to raise the voltage on lead 250 an amount corresponding to the impedance of resistor R.

The output of inverter 242 similarly extends to positive battery on lead 248 by way of a diode which is shown as diode 249. In addition, the output of inverter 242 extends to output lead 250 via resistor $R/2$. Accordingly, when the output of inverter 242 is positive, the voltage on lead 250 is thus raised in accordance with the impedance of resistor $R/2$. In the present embodiment, the impedance of resistor $R/2$ is designed to be one-half the impedance of resistor R. Accordingly, the output of inverter 242 will raise the potential on lead 250 twice as much as a corresponding output of inverter 241. Similarly, inverters 243 and 244 and 321 through 324 are connected to lead 250 by way of successive resistors having half the impedance of resistors immediately prior thereto. Thus, the weight of the voltage change on lead 250 in response to a positive output of any one of inverters 241 through 244 and 321 through 324 will double for each successive one of the inverters.

Recalling now that the reset output of binary stage 221 is connected to the input of inverter 241 and further recalling that the reset output of flip-flop 221 provides a negative condition when the flip-flop is set, it is thus seen that inverter 241 generates a positive output condition when flip-flop 221 is set. The setting of flip-flop 221 thus increases the positive potential applied to lead 250. Since this condition is applied through resistor R, however, the resultant change provides the least significant weight to correspond to the digit position of stage 221. Similarly, the setting of any one of the subsequent binary stages in counter 108 results in a positive output condition in a corresponding one of the inverters and a consequent increased potential on lead 250 having a weight corresponding to the significance of the digit position of the binary flip-flop stage. Accordingly, the cumulative voltage on lead 250 corresponds to the digital count in counter 108. This voltage provides a bias for the varactor diodes in the tank circuit of clock oscillator 104, modifying the frequency of the oscillator in the manner described in the above-identified patent of W. Kaminski et al.

Assuming now that the transitions of the data signals lead the output timing signals, averaging circuit 103 provides an add impulse to lead 111 to advance the phase of countdown circuit 105, as previously described. In addition, the add pulse on lead 111 is passed to logic circuit 107 and thus applied to inverter 210. The resultant negative impulse at the output of inverter 210 is, in turn, applied to gate 211. As a consequence, the three inputs to gate 211 are momentarily negative, whereby a negative impulse is provided at the output of gate 211, and applied to gate 227, which, in turn, provides a negative impulse to the toggle input of flip-flop 221, as previously described. Accordingly, the state of flip-flop 221 is reversed, thereby advancing by one count the number stored in counter 108. Consequently, the potential on lead 250 is increased by a unit increment. The reverse bias on the varactor diodes is thus increased and the frequency of the oscillator circuit is correspondingly increased by a unit increment. Thus, with the incoming data signal transitions leading the timing signals, the phase of the timing signals is advanced and the clock frequency is increased.

Conversely, if the output timing signals applied to lead 106 are leading the transitions of the input data signals, averaging circuit 103 applies a delete impulse to lead 112. This impulse is applied to countdown circuit 105 to retard the phase of the timing signals. In addition, the impulse on lead 112 is applied to inverter 215 and, as previously described, inverter 215 thus applies a negative impulse to OR gate 216. Accordingly, OR gate 216 passes a negative impulse to monopulser 231 and to AND gate 227. As previously described, this causes a reverse count in counter 108, thus subtracting one from the count previously stored in counter 108. Accordingly, the voltage on lead 250 is reduced by one increment, correspondingly reducing the frequency of the oscillator clock.

Assuming now that there is a transmission failure resulting in the loss of signal reception, it is apparent that the phase of the receiving clock might slowly drift away from the sending end clock. Accordingly, when line signals are restored, a plurality of add or delete pulses will be generated by averaging circuit 103 to correct the loss of phase synchronism. However, the add or delete pulses would normally also change the frequency of the clock oscillator, pulling the oscillator frequency away from its prior match with the sending end oscillator frequency. Accordingly, interval timer 213 is provided to prevent add or delete pulses from pulling the oscillator frequency immediately after a drop-out period.

Assuming now that a drop-out period has just terminated, averaging circuit 103 will provide continuous correction pulses because a plurality of incremental corrections are required to eliminate the significant difference in phase between the incoming transitions and the timing signals, the average time between the pulses being controlled by averaging circuit 103 and typically less than about 100 milliseconds. It is recalled that the first add pulse applied to inverter 210 is passed by gate 211 to counter 108. In addition, it is recalled that the output of inverter 210 also extends to the input of AND gate 212. Accordingly, AND gate 212 applies a negative transition to interval timer 213. Interval timer 213 applies a positive condition to OR gate 211 for an interval of much more than 100 milliseconds but less than the minimum time between frequency corrections. In the event that another add pulse is applied to inverter 210 prior to the time-out of interval timer 213, it is thus seen that the positive condition applied to OR gate 211 by interval timer 213 maintains the output of OR gate 211 in a positive condition. Thus, interval timer 213 precludes the application of the add impulses to counter 108 by way of OR gate 211. In addition, the application of each subsequent add pulse to interval timer 213 recycles the timer to initiate a new timing period. Accordingly, with the interval between add pulses less than the minimum time between frequency corrections, the application of the pulses to counter 108 is blocked and the count in counter 108 is maintained. Similarly, delete pulses occurring more rapidly than the timer interval are blocked from counter 108 since the delete pulses are provided by inverter 215 to the input of AND gate 212 whereby interval timer 213 disables gate 216. Accordingly, any pulse following a prior pulse and less than the timer interval thereafter is blocked by interval timer 213 and precluded from modifying the frequency of the clock oscillator.

When counter 108 is full it is desirable to preclude the application of an add pulse which would recycle the counter and thus incorrectly drop the voltage on lead 250. OR gate 218 provides the function of blocking the add pulse. As previously described, the "0" outputs of the binary stages extend to the inputs of OR gate 218. Since the "0" output of each binary stage is negative when the stage is set, the output of gate 218 is positive unless binary counter 108 contains a full count where all stages are set. In this event, the output of OR gate 218 goes negative and inverter 250 applies a positive condition to OR gate 211. This maintains the output of gate 211 positive, blocking the application of add pulses to counter 108.

Similarly, it is desirable to preclude the application of delete pulses to counter 108 when the counter is empty. This function is provided by OR gate 219 whose output goes negative only when the counter is empty since the OR gate 219 inputs are connected to the "1" outputs of the binary stages. This negative output is applied to inverter 251 which provides a positive condition to gate 216. Thus the output of gate 216 is maintained positive, blocking the passage of delete pulses to counter 108.

Although a specific embodiment of the invention has been shown and described, it will be understood that various modifications may be made without departing from the spirit of the invention and within the scope of the appended claims.

What is claimed is:

1. In a synchronizing circuit for a clock oscillator wherein the phase of the clock output pulse is compared with the phase of incoming signals to derive indications of the phase difference, the combination of means responsive to said indications for modifying the frequency of said clock oscillator in accordance therewith, and means for precluding the application of said indications to said frequency modifying means, said preclusion means rendered operable when the repetition rate of said indications exceeds a predetermined threshold.

2. In a synchronizing circuit for a clock oscillator wherein the phase of the clock output pulse is compared with the phase of incoming signals to derive indications of the phase difference, the combination of means responsive to said indications to modify the phase of said clock pulses in accordance therewith, means responsive to said indications for modifying the frequency of said clock oscillator in accordance therewith, and means for precluding the application of said indications to said frequency modifying means, said preclusion means rendered operable when the repetition rate of said indications exceeds a predetermined threshold.

3. In a synchronizing circuit for a clock oscillator wherein the phase of the clock output pulse is compared with the phase of incoming signals to derive indications of the phase difference, the combination of means for gating said indications, timing means responsive to said indications for disabling said gate for a predetermned interval of time, and frequency modifying means connected to the output of said gating means for modifying the frequency of said clock oscillator in response to said gated indications.

4. In a synchronizing circuit for a clock oscillator wherein the phase of the clock output pulse is compared with the phase of incoming signals to derive indications of the phase difference, the combination of means responsive to said indications to modify the phase of said clock pulses in accordance therewith, means for gating said indications, timing means responsive to said indications for disabling said gate for a predetermined interval of time, and frequency modifying means connected to the output of said gating means for modifying the frequency of said clock oscillator in response to said gated indications.

5. In a synchronizing circuit for a clock oscillator wherein the phase of the clock output pulses are compared with the phase of incoming signals to derive indications of the direction of any relative phase difference, a reversible binary counter responsive to said indications for accumulating a count and modifying said count in accordance with said direction of said indication, and a digital-to-analog converter responsive to said counter for modifying the frequency of said clock oscillator in accordance with the weight of said accumulated count.

6. In a synchronizing circuit for a clock oscillator wherein the phase of the clock output pulses is compared with the phase of incoming signals to derive indications of the direction of any relative phase difference, means for gating said indications, timing means responsive to said indications for disabling said gate for a predetermined interval of time, a reversible binary counter connected to the output of said gate and responsive to said gated indications for accumulating a count and modifying said count in accordance with said direction of said indication, and a digital-to-analog converter responsive to said counter for modifying the frequency of said clock oscillator in accordance with the weight of said accumulated count.

7. In a synchronizing circuit for a clock oscillator wherein the phase of the clock output pulses is compared with the phase of incoming signals to derive indications of the direction of any relative phase difference, means responsive to said indications for modifying the phase of said clock pulses in accordance with said direction, means for gating said indications, timing means responsive to said indications for disabling said gate for a predetermined interval of time, a reversible binary counter connected to the output of said gate and responsive to said gated indications for accumulating a count and modifying said count in accordance with said direction of said indication, and a digital-to-analog converter responsive to said counter for modifying the frequency of said clock oscillator in accordance with the weight of said accumulated count.

8. In a synchronizing circuit for a clock oscillator wherein the phase of the clock output pulses is compared with the phase of incoming signals to derive indications of the direction of any relative phase difference, a reversible binary counter for accumulating a count, first gating means responsive to each indication of a first one of said directions for advancing said count of said binary counter, second gating means responsive to each indication of a second one of said directions for reducing said count of said binary counter, and a digital-to-analog converter responsive to said counter for modifying the frequency of said clock oscillator in accordance with the weight of said accumulated count.

9. In a synchronizing circuit for a clock oscillator wherein the phase of the clock output pulses are compared with the phase of incoming signals to derive indications of the direction of any relative phase difference, a reversible binary counter for accumulating a count, first gating means responsive to each indication of a first one of said directions for advancing said count of said binary counter, second gating means responsive to each indication of a second one of said directions for reducing said count of said binary counter, a digital-to-analog converter responsive to said counter for modifying the frequency of said clock oscillator in accordance with the weight of said accumulated count, and timing means responsive to each of said indications for thereafter blocking said first and second gating means for a predetermined interval of time.

References Cited by the Applicant

UNITED STATES PATENTS

| | | |
|---|---|---|
| 3,080,452 | 3/1963 | Rudolph et al. |
| 3,139,593 | 6/1964 | Kaminski et al. |

ROY LAKE, *Primary Examiner.*

J. KOMINSKI, *Examiner.*